United States Patent [19]
Eckart et al.

[11] Patent Number: 5,643,666
[45] Date of Patent: Jul. 1, 1997

[54] SOLID SURFACES WHICH ARE PREPARED FROM COPOLYESTERS LAMINATED ONTO A HIGH RESOLUTION IMAGE

[75] Inventors: Michael Dennis Eckart, Blountville, Tenn.; Raymond Lynn Goodson, Sandy, Utah

[73] Assignee: Eastman Chemical Company, Kingsport, Tenn.

[21] Appl. No.: 575,454

[22] Filed: Dec. 20, 1995

[51] Int. Cl.[6] .................. B32B 27/08; C09D 5/29
[52] U.S. Cl. .................. 428/339; 528/272; 528/302; 528/307; 528/308; 528/308.6; 428/15; 428/221; 428/332; 428/354; 523/171
[58] Field of Search .................. 528/272, 302, 528/307, 308, 308.6; 428/15, 221, 332, 339, 354, 480, 481, 483; 523/171

[56] References Cited

U.S. PATENT DOCUMENTS

| | | | |
|---|---|---|---|
| 3,396,067 | 8/1968 | Schafer | 161/5 |
| 4,289,818 | 9/1981 | Casamayor | 428/43 |
| 4,433,070 | 2/1984 | Ross et al. | 523/171 |
| 4,544,584 | 10/1985 | Ross et al. | 428/15 |
| 5,286,290 | 2/1994 | Risley | 106/401 |

*Primary Examiner*—Samuel A. Acquah
*Attorney, Agent, or Firm*—Cheryl J. Tubach; Harry J. Gwinnell

[57] ABSTRACT

This invention relates to a solid surface which is prepared from a copolyester laminated onto an image layer. More particularly, the solid surface contains an outer layer of transparent PETG copolyester, a polymeric film with a high resolution image printed thereon, and a backing layer. The image can be selected to give the solid surface the appearance of natural building materials, such a wood and stone.

19 Claims, 2 Drawing Sheets

SOLID SURFACES WHICH ARE PREPARED FROM COPOLYESTERS LAMINATED ONTO A HIGH RESOLUTION IMAGE

FIELD OF THE INVENTION

The present invention relates to solid surfaces which are prepared from copolyesters laminated onto a image layer.

BACKGROUND OF THE INVENTION

The widespread use of natural building materials such as wood and stone has resulted in a scarcity of these resources. As the consumption of natural building materials increases, their availability decreases, generally driving up the price of the natural building materials. In addition, natural building materials often must be harvested at a location far distant from population centers. Thus, the cost of transporting the natural building materials often adds substantially to their ultimate cost. Stone is particularly expensive to transport due to its high density.

Synthetic building materials typically excel over natural building materials in terms of, for example, strength, flexibility, durability, water resistance, resiliency, repair, continuity, and stain resistance. Synthetic building materials are also more efficient in terms of cost, ease of transportation, and impact on environmental resources, but, are often overlooked because builders and consumers seek the traditional, familiarity, and, sometimes opulence of natural building materials.

Manufacturers have tried to formulate functional synthetic building materials that have the appearance of natural building materials, i.e. wood or stone. One method that has been tried is to add pigment to typically colorless synthetic materials such as high density polymers and high density cast solid surface materials. This process imparts a solid color to the synthetic materials, without the patterns and color variations found in natural materials and other desirable images.

Cultured marble is another material that is sometimes used for building materials. Patterns in cultured marble can be formed by mixing or swirling pigment into a synthetic medium. Thus, color variations in cultured marble are limited to nearly random variations or to solid colors.

U.S. Pat. Nos. 4,544,584, 4,433,070, and 4,433,070, disclose cultured onyx or cultured marble fabricated which is prepared by combining (a) a locally discontinuous phase (filler) containing a synthetic organic resin portion hardened to a predetermined hardness, and (b) a visually distinguishable continuous phase containing a synthetic organic resin portion hardened to the same predetermined hardness wherein the discontinuous phase is distributed in the discontinuous phase. Colorant is mixed with the continuous phase resin by swirling, agitating, or adding from single or multiple points in thin or thick streams to produce different effects.

U.S. Pat. No. 3,396,067, describes a synthetic onyx fabricated by blending polyester resins and one or more fillers such as silicas or glass.

U.S. Pat. No. 5,286,290, discloses artificial granite wherein particles of alumina trihydrate are treated with an aqueous slurry of dye or pigment such that the dye or pigment is absorbed along with water. After drying, the particles are colored throughout, so that if a particle is sliced, the interior color is similar to the surface color. The colored particles are formed into a synthetic stone by incorporation into a liquid resin matrix that is subsequently hardened.

Laminates are known in the prior art as materials incorporating printed patterns. Traditional laminates, however, cannot be thermo-formed, and are generally rigid and brittle.

U.S. Pat. No. 4,289,818, discloses a paneling member for providing protective paneling for a walled recess, such as for a shower stall or bathtub, wherein the paneling member is co-extruded from at least two different polymeric materials such an acrylonitrile-butadiene-styrene (ABS) base layer and an acrylic surface layer. It is also disclosed that such panels can be laminated.

Accordingly, what is needed in the art is a laminated synthetic building material incorporating a high resolution image of a natural building material such as wood or stone, wherein the synthetic building material can be thermo-formed into selected shapes.

SUMMARY OF THE INVENTION

The present invention is directed to a solid surface prepared from copolyesters laminated onto an image layer comprising:

(A) an outer layer comprising a transparent PETG copolyester having an inherent viscosity of 0.5 to 1.2 dL/g, comprising
  (1) a dicarboxylic acid component comprising repeat units from at least 80 mole percent of terephthalic acid or dimethylterephthalate; and
  (2) a diol component comprising repeat units from ethylene glycol and 2 to 99 mole percent of cyclohexanedimethanol, based on 100 mole percent dicarboxylic acid and 100 mole percent diol;

(B) a polymeric film having a top side and a bottom side, wherein an image is printed on one of said sides and said film is joined to said outer layer such that said image can be seen through said outer layer; and (C) a backing layer comprising a polymer selected from the group consisting of polyvinyl chloride and PETG copolyester, said backing layer having a side joined to said polymeric film opposite said outer layer; wherein said outer layer and said backing layer are thermally compatible.

BRIEF DESCRIPTION OF THE DRAWINGS

The present invention is better understood with reference to the accompanying drawings and detailed description wherein.

DESCRIPTION OF THE INVENTION

Figure 1:
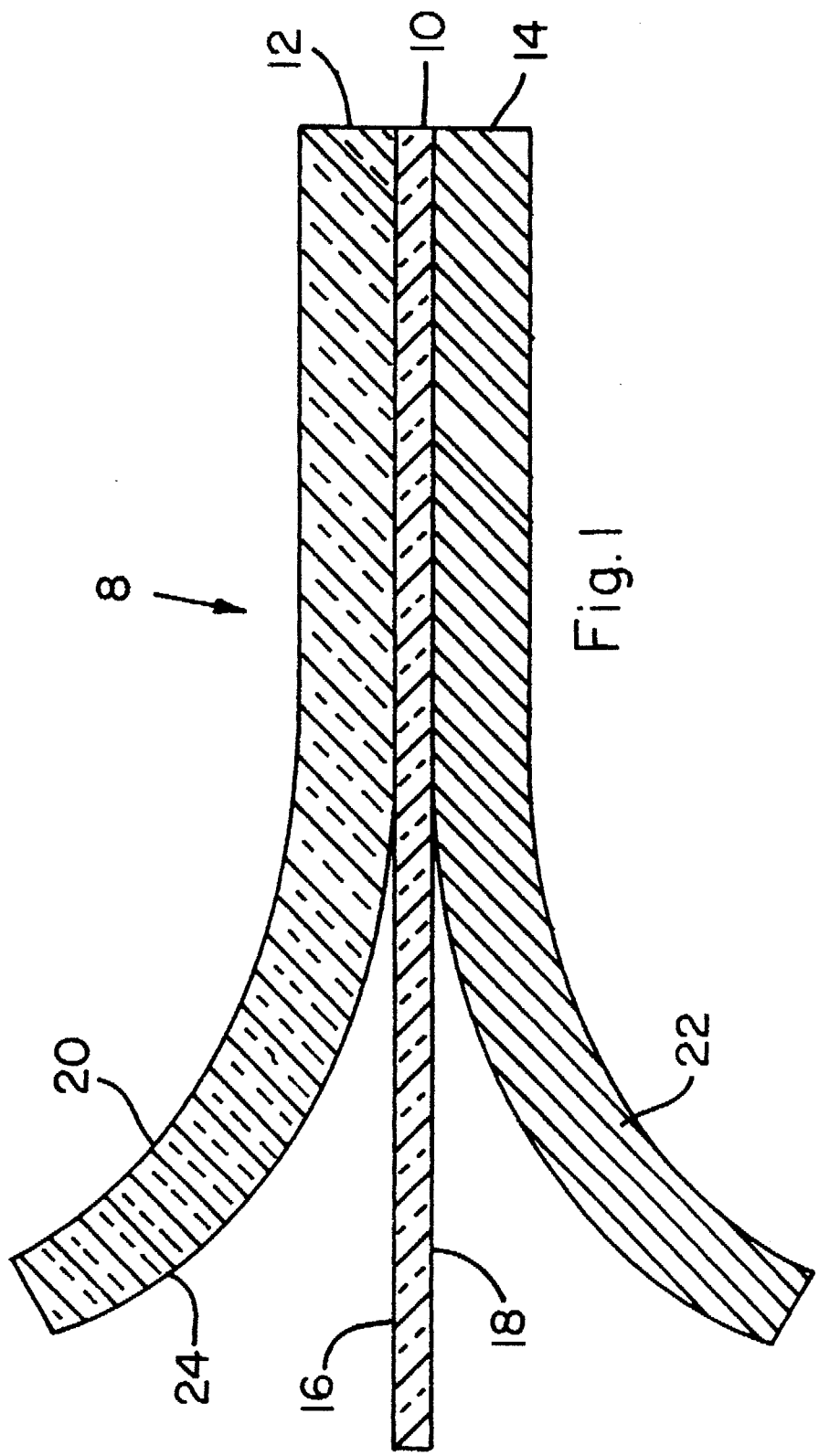
FIG. 1 is a partially separated, cross-section of a substantially planar solid surface for use in fabricating laminated synthetic building materials according to the present invention.

This invention relates to a solid surface which is prepared from a copolyester laminated onto a high resolution image layer. More particularly, the solid surface contains an outer layer of transparent PETG copolyester, a polymeric film with a high resolution image printed thereon, and a backing layer. The image can be selected to give the solid surface the appearance of natural building materials, such a wood and stone.

Component (A) of the solid surface of the present invention is an outer layer of transparent PETG copolyester having sufficient strength and durability to form an exterior surface. As defined herein "PETG copolyesters" are poly (ethylene terephthalate) polyesters modified with 2 mole % to 99 mole % of cyclohexanedimethanol repeat unit. The cyclohexanedimethanol may be either the 1,4- or 1,3-isomer and may be either in the cis- or trans- form or a mixture of the isomers. The PETG copolyester may be semi-crystalline or amorphous, preferably amorphous. The PETG copolyester contains repeat units from a dicarboxylic acid and a diol, based on 100 mole percent dicarboxylic acid and 100 mole percent diol.

The dicarboxylic acid component contains at least 80 mole percent of terephthalic acid or dimethylterephthalate. The PETG copolyester may optionally be modified with up to 20 mole percent, based on 100 mole percent dicarboxylic acid, of one or more different dicarboxylic acids other than terephthalic acid or dimethylterephthalate. Specific examples other dicarboxylic acids are: phthalic acid, isophthalic acid, naphthalenedicarboxylic acid, cyclohexanedicarboxylic acid, cyclohexanediacetic acid, diphenyl-4,4'-dicarboxylic acid, stilbenedicarboxylic acid, oxydibenzoic acid, biphenyldicarboxylic acid, succinic acid, glutaric acid, adipic acid, azelaic acid, and sebacic acid. The PETG copolyester may be prepared from one or more of the above dicarboxylic acids.

It should be understood that use of the corresponding acid anhydrides, esters, and acid chlorides of these acids is included in the term "dicarboxylic acid".

The diol component contains repeat units from ethylene glycol and 2 to 99 mole percent cyclohexanedimethanol. In addition, the diol component can optionally be modified with up to 20 mole percent, based on 100 mole percent diol, of one or more different diols other than ethylene glycol and cyclohexanedimethanol. Such additional diols include cycloaliphatic diols having 6 to 15 carbon atoms and aliphatic diols having 3 to 8 carbon atoms. Examples of suitable diols other than ethylene glycol and cyclohexanedimethanol include: 1,2-propanediol, 1,3-propanediol, neopentyl glycol, 1,4-butanediol, 1,5-pentanediol, 1,6-hexanediol, 2,2,4,4-tetramethyl-1,3-cyclobutanediol (trans- or cis- or mixtures thereof), and p-xylene glycol. The PETG copolyester may be prepared from one or more of the above diols. The PETG copolyesters may also be modified with polyethylene glycols or polytetramethylene glycols to enhance elastomeric behavior.

The PETG copolyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The PETG copolyester has an inherent viscosity of 0.5 to 1.2 dL/g. Preferably, the PETG copolyester has an inherent viscosity of 0.6 to 0.9 dL/g as measured at 25° C. using 0.50 grams of polymer per 100 ml of a solvent consisting of 60% by weight phenol and 40% by weight tetrachloroethane. It is preferred that the PETG copolyesters be prepared from or derived from repeating units consisting of terephthalic acid units, ethylene glycol units, and 1,4-cyclohexanedimethanol units. The PETG copolyester may be prepared by conventional polycondensation procedures well-known in the art. Such processes include direct condensation of the dicarboxylic acid(s) with the diols or by ester interchange using a dialkyl dicarboxylate. For example, a dialkyl terephthalate such as dimethyl terephthalate is ester interchanged with the diols at elevated temperatures in the presence of a catalyst.

Component (B) of the solid surface is a polymeric film having a top side and a bottom side, wherein an image is printed on one of the sides and the film is joined to the outer layer such that the image can be seen through the outer layer. The polymeric film can be composed of any suitable polymeric material that is compatible with the materials used for the outer layer and the backing layer, inks, and other materials used in fabricating the solid surface. Preferably, the film comprises a polyvinyl chloride (PVC) or PETG copolyester.

The polymeric film preferably ranges from about 0.025 mm (0.001 inch) to about 0.254 mm (0.010 inch) in thickness, and more preferably 0.051 mm (0.002 inch) to about 0.178 mm (0.007 inch) and most preferably about 0.076 mm (0.003 inch) in thickness. However, polymeric films thinner or thicker can be used depending on the equipment available, and under such conditions the thickness is limited only by functionality. The film should not be distorted or opacified by the process of being bonded to the outer layer and backing layer. The bonds between the film layer and the backing layer should be strong enough that there is not delamination upon use as a building material or exposure to solvents.

Preferably, the image is printed on the bottom side of the polymeric film layer. If the image is printed on the bottom side of the polymeric film layer, than the polymeric film should be transparent. Any image may be used, for example, images of natural building materials. As used herein the term "building material" means a material of suitable strength, durability, impact resistance, and rigidity that it can be used in construction of articles that could also be constructed of natural building materials such as wood or stone. Illustrative articles that could be constructed of a building material include: counter tops, table tops, cabinet doors, game boards, juvenile products, toys, panels for shower stalls, indoor and outdoor signs, seamless vanity tops including sink, soap dish, and back splash.

The image is printed by a high resolution process, such as the gravure process, containing about 872/square cm to about 3488/square cm (5,625 to about 22,500 dots per square inch). The outer layer and the backing layer is each about 0.76 mm to about 6.4 mm thick (0.030 to about 0.250 inch thick), and the film is about 0.025 mm to about 0.254 mm (0.001 to about 0.010 inch) thick. Preferably, the film comprises a material selected from polyvinyl chloride (PVC) or PETG copolyesters. It is also preferred that the solid surface have a layer of colorless laminating ink between the film and outer layer to aid in avoiding air pockets.

Component (C) is a backing layer of polymer having a side joined to the film opposite the outer layer. The backing layer of polymer may be either transparent or opaque. Hence, the layer opposite the image layer may be comprised of mixtures or recycled resins which do not necessarily retain transparency or even contain materials to further enhance or modify the properties of the finished laminate. However, the outer layer, component (A), and the backing layer, component (C), must be thermally compatible. As used herein, the term "thermal compatibility" means that when layers of the solid surface according to the present invention are bonded together under conditions of elevated temperature and pressure, that the layers undergo approximately equal thermal expansion or contraction such that the solid surface is substantially planar. The solid surface is thermoformable according to methods known in the art of thermoforming.

The backing layer should exhibit good impact resistance, strength, and compatibility with the film. The backing layer is preferably from about 1.0 mm to 3.2 mm (0.040 to 0.125 inches) thick, but is more preferably about 1.5 mm (0.060 inches) thick. The thickness of the backing layer is limited only by functionality. Preferably, the backing layer is prepared from a PETG copolyester. The PETG for the backing layer can be recycled PETG, since recycled PETG is less expensive than virgin PETG and good optical qualities of the backing layer are not important.

Another embodiment of the invention further comprises a transparent bilayer coat laminated to the top surface of the transparent outer layer, the bilayer coat comprising a hard, scratch-resistant coat over a thin film. This hard, scratch-resistant coat is preferably selected from the group of UV-cured cross-linked acrylic, electron-beam-cured cross-linked acrylic, vacuum-cured urethane, UV-cured or electron-beam-cured silicon with acrylic or heat cured urethane or plastisol, and combinations thereof. It is also preferable that this embodiment comprise a layer of colorless laminating ink between the transparent outer layer and the bilayer coat.

Referring to the drawings, FIG. 1 illustrates a partially separated, cross-section of a substantially planar solid surface 8 for use in fabricating laminated synthetic building materials according to the present invention. The solid surface 8 comprises three layers: a thin film layer 10, a transparent outer layer 12, and a backing layer 14. The outer layer 12 and backing layer 14 provide the strength, chemical resistance, impact resistance, scratch resistance and other qualities necessary for the solid surface to be used as a building material, while the film layer 10 is printed with a selected image that provides a pleasing appearance to the laminate 8.

According to FIG. 1, the film layer 10 has a top surface 16 and a bottom surface 18, the top surface 16 being placed adjacent to the outer layer 12 and the bottom surface 18 adjacent to the backing 14. An image is printed on either the top surface 16 or the bottom surface 18 by any suitable process known in the art, such as the gravure process, to provide the image that gives the attractive appearance to the finished product. If the image is printed on the bottom surface 18, then the film must be transparent so that the printed image can be seen through the outer layer 12. If the image is printed on the top surface 16, then the film 10 need not be transparent.

The image to be printed on the film layer 10 can be prepared according to conventional photographic printing processes or with a digitized database generated from a photographic image, such as the image of a wood-grain, natural stone, or the like or other selected image. Digitizing and storing the image may be accomplished through any of a number of processes well known in the computer art as "scanning".

Printing a selected image on the film layer 10 can be accomplished by engraving one or more cylinders, and using such cylinders to print the selected engraved image on the film layer 10 with appropriate ink, according to processes well known in the printing art. The resolution of the printing process should be in the range of about 30–59 dots per linear cm (75–175 dots per linear inch), i.e. about 872 cm$^2$–3,488 cm$^2$ (5,625–22,500 dots per square inch). An illustrative example of how this printing process can be used for "bottom printing" a wood grain image on the bottom surface 18 of the film 10 comprises using a first cylinder for first printing a pattern of black or other dark colored ink corresponding to the most prominent and most widely spaced grain lines, i.e. coarse grain. A second cylinder is then used for printing smaller, more closely spaced grain lines, i.e. fine grain, again using black or other dark colored ink. Next, a third cylinder is used for printing colored bands on the film.

For example, in an illustrative embodiment bands about 3.8 cm (1.5 inch) wide and spaced apart by about 3.8 cm (1.5 inch) are printed in a selected brown color. These bands give the effect of color variations within the wood, and the widths, spacing, and color of such bands are all selectable. Lastly, a fourth cylinder is used for printing a relatively solid background color of a selected shade of brown or other color corresponding to the color of the type of wood being simulated. Also, additional cylinders may be used to provide even more image effects in the printed layer. It is considered that a person of ordinary skill in the art could select more or fewer cylinders and printing steps to prepare a selected image.

These steps would be reversed for top printing an image on the top surface 16 of the film 10, i.e. the solid color would be printed first followed in succession by printing of the bands, fine grain, and coarse grain. Typically, there is some stretching of the film during printing. Therefore, the second cylinder should be slightly larger than the first cylinder, the third slightly larger than the second, and the fourth slightly larger than the third, so that the image printed with each cylinder is in proper register. The printing is typically done on rolls of film 122 cm (48 inches) wide and 70 m (2300 ft) or greater in length.

The ink used in the printing process is critical to the process of producing a durable laminate that is resistant to delamination. During bonding together of the layers of the laminate, the layers of ink should bond together as well as to the film and backing layer (for bottom printing) or outer layer (for top printing). Inks particularly for this process are a solvent-based laminating inks comprising about 20–70% solvent and about 5 to 50% pigments, polymers, and formulation aids such as those provided by Zeneka, Chicago, Ill. However, other types of inks or pigment formulations may also be used provided by other manufacturers.

According to FIG. 1, the transparent outer layer 12 forms the exterior surface of the laminate and, ultimately, of the building material that comprises the laminate. The outer layer 12 should thus have the properties necessary for a selected application. For example, a building material to be used for counter tops and table tops should be scratch resistant, resistant to common chemicals, strong enough to bear the weight of items that would reasonable be placed thereon, reasonably thermal resistant and impact resistant, and so forth. It should also be compatible with the film layer 10 such that outer layer 12 and film layer 10 bond together during the lamination process without significantly disturbing the optical properties of either layer or the strength and resistance properties of the outer layer 12. The outer layer 12 should also have thermal properties of expansion and contraction that are compatible with the backing layer 14, otherwise unacceptable distortion of the laminate may occur in the course of the lamination process.

The film layer 10, outer layer 12, and backing layer 14 are positioned together with the top surface 16 of the film layer 10 adjacent to the outer layer 12 and the bottom surface 18 of the film layer 10 adjacent to the backing layer 14. When the layers are positioned in this manner, the exterior surface 20 of the outer layer 12 forms the exterior of the laminate, and the exterior surface 22 of the backing layer 14 forms the ultimate lower surface of the laminate.

The layers positioned as described are bonded together by exposing the laminate to temperatures sufficient to cause the layers to bond to each other without causing decomposition, distortion, or other undesirable effects. A person of ordinary skill in the art can select such temperatures without undue experimentation. The following temperature ranges are illustrative of those used for a PETG laminate. The layers of a PETG-containing laminate are bonded together by exposing the laminate to a temperature in the range of 90° C. (195° F.) to 300° (510° F.) but more preferably at a temperature of about 129° C. (265° F.) to about 260° C. (500° F.) at a pressure ranging from about 0.65 MPa (95 psi) to about 3.45 MPa (500 psi), for about 4 to 24 minutes, or until such time as a bond is formed between all of the respective layers. After 4 to 24 minutes, the bonded laminate is allowed to cool under pressures from about 0.69 MPa to about 2.4 MPa (100 psi to about 350 psi), but preferably about 1.4 MPa (200 psi) until it cools to near ambient temperature.

During the bonding process with a PETG-containing laminate, for example, the PETG outer layer and PVC or PETG film layer bond to each other. Sometimes, air is trapped between the outer layer and the film layer, causing unattractive air pockets between the layers. This is a particular problem when fabricating large laminates, such as would be used in a shower stall. The problem of air pocket formation can be avoided by spraying either the top surface 16 of the film layer 10 or the bottom surface 24 of the outer layer 12 with a colories laminating ink or adhesive (FIG. 1). During the bonding process, the ink forms minute channels that permit escape of the air from between the outer layer and film layer, thus eliminating formation of air pockets.

Figure 2:
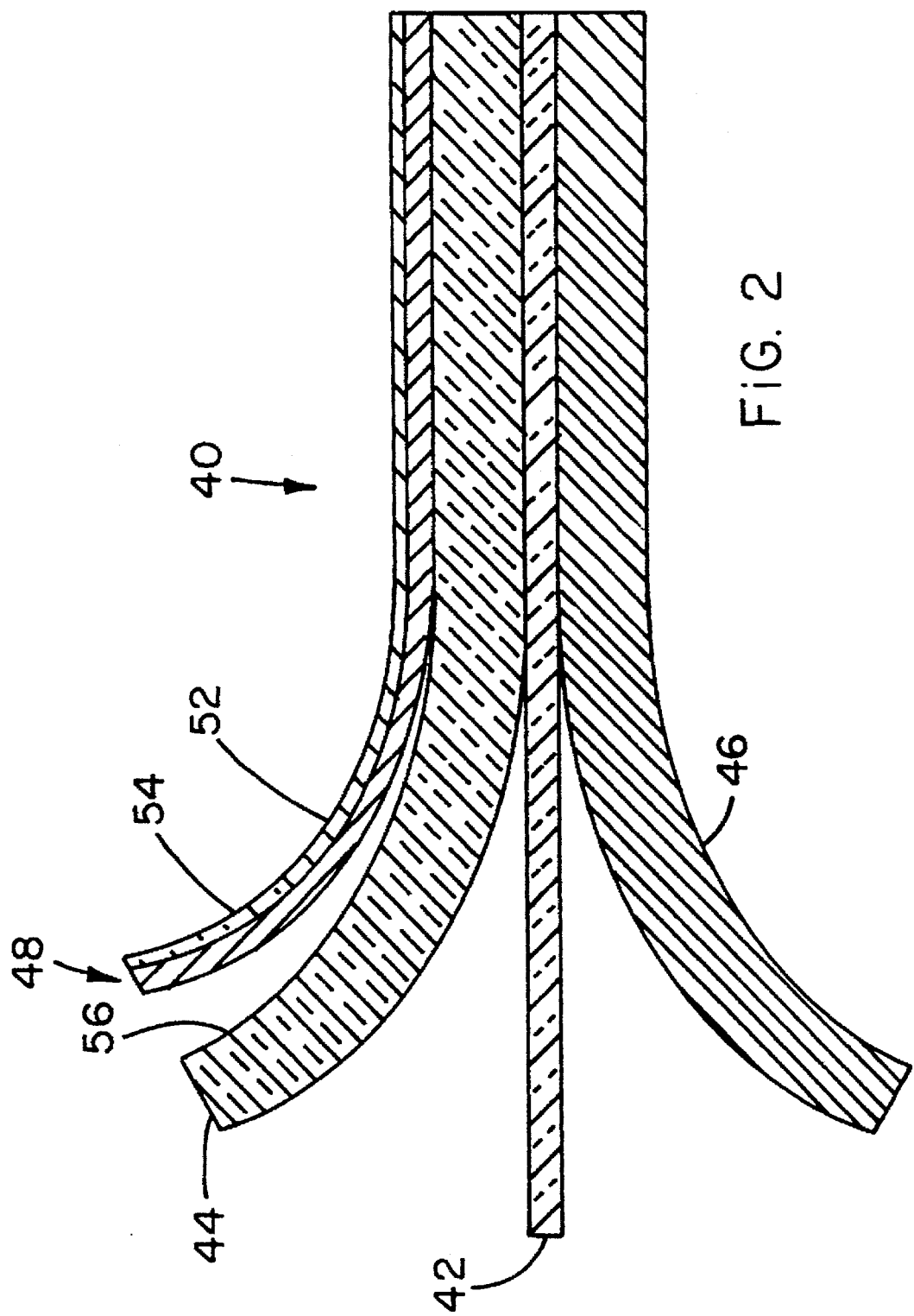
FIG. 2 is a partially separated, cross-section of a substantially planar solid surface for use in fabricating laminated synthetic building materials according to the present invention.

Depending on a particular intended application for a laminated synthetic building material according to the present invention, it may be advisable to place an additional layer, such as a thin flexible plastic film having a melting point higher than the PETG melting point, over the exterior surface of the outer layer. For example, PETG is not as hard or scratch resistant as would be desirable for certain uses. Thus, for anapplication where the exterior surface might be subjected to being scratched, i.e. on a counter top, it would be advisable to place a hard coat over the exterior surface. Such a hard coat is illustrated in FIG. 2, wherein there is shown a solid surface 40 comprising a thin film layer 42, a transparent outer layer 44, and a backing layer 46.

In a process to prepare the solid surface, a fabric pad, preferably about ½ inch thick may be placed on the thin flexible plastic film placed on top of the PETG outer layer. In addition, a flexible steel plate, preferably having a thickness of 20 mills to 140 mills may be placed on top of the fabric pad before placing the solid surface into a hydraulic press.

The solid surface 40 further comprises a bilayer coat 48 comprising a polyester or PETG film 50 coated on an exterior surface 52 thereof with a hard coat 54 composed of UV-cured cross-linked acrylic, electron-beam-cured cross-linked acrylic, vacuum-cured urethane, UV-cured or electron-beam-cured silicon with acrylic or heat cured urethane or plastisol, and combinations thereof.

The bilayer coat 48 is laminated and bonded to the top surface 56 of outer layer 44 such that the bilayer coat 48 forms the exterior surface of the laminate 40. The bilayer coat 48 is necessarily transparent so that the image printed on the film layer 42 is visible. Preferably, a colorless laminating ink or adhesive is used in the bonding process to bond the outer layer 44 and bilayer coat 48 together and/or evacuate air pockets that could form, as described above.

Once the solid surface is cooled, it can be shaped and formed into a variety of useful products by the process known as thermoforming. As an illustrative example, the solid surface can be thermoformed into a vanity top or unitized sink by impressing a sink 10–15 cm (4–6 inches) deep and soap dish into the center, and bending a backsplash up from the back. Thermoforming of the solid surface of the present invention generally requires temperatures ranging from about 100° C. (210° F.) to about 220° C. (425° F.). Pressures needed to thermoform the various shapes are a function of the temperature, the product shape, and the tools used to thermoform the laminate. Such conditions of temperature and pressure can be determined by a person of ordinary skill in the art of thermoforming without undue experimentation.

Numerous modifications and alternative arrangements such multiple laminate layers and multiple image layers may be devised by those skilled in the art without departing from the spirit and scope of the present invention, and the appended claims are intended to cover such modifications and arrangements. Solid surfaces consisting of as many as seventeen different layers have been created using the techniques described in this invention.

The solid surfaces prepared according to the present invention provide a product by which a high resolution image can be incorporated into synthetic thermoplastic resins embodied as building materials which are durable and have an appealing appearance. The building materials, such as wood and stone, are also low cost, easy to manufacture and repair in a continuous configuration. Moreover, the synthetic building materials, having a layer containing a printed image, that can be formed and molded without substantially distorting the image formed therein. In addition, the building materials prepared by the present invention have an appealing appearance with low density to facilitate transport and manipulation.

Many variations will suggest themselves to those skilled in this art in light of the above detailed description. All such obvious modifications are within the full intended scope of the appended claims.

What is claimed is:

1. A solid surface prepared from copolyesters laminated onto an image layer comprising:
    (A) an outer layer comprising a transparent PETG copolyester having an inherent viscosity of 0.5 to 1.2 dL/g, comprising
        (1) a dicarboxylic acid component comprising repeat units from at least 80 mole percent of terephthalic acid or dimethylterephthalate; and
        (2) a diol component comprising repeat units from ethylene glycol and 2 to 99 mole percent of cyclohexanedimethanol, based on 100 mole percent dicarboxylic acid and 100 mole percent diol;
    (B) a polymeric film having a top side and a bottom side, wherein an image is printed on one of said sides and said film is joined to said outer layer such that said image can be seen through said outer layer; and
    (C) a backing layer comprising a polymer selected from the group consisting of polyvinyl chloride and PETG copolyester, said backing layer having a side joined to said polymeric film opposite said outer layer; wherein said outer layer and said backing layer are thermally compatible.

2. The solid surface of claim 1 wherein the diol component of the PETG copolyester comprises repeat units from 67 to 75 mole percent of ethylene glycol and 33 to 25 mole percent of 1,4-cyclohexanedimethanol.

3. The solid surface of claim 1 wherein said polymeric film, component (B), is transparent and said image is printed on the bottom side of said film.

4. The solid surface of claim 1 wherein said outer layer, polymeric film, and backing layer are bonded together with sufficient strength, rigidity, and impact resistance for use as a building material.

5. The solid surface of claim 1 wherein said image is of a natural building material.

6. The solid surface of claim 5 wherein said natural building material is wood.

7. The solid surface of claim 5 wherein said natural building material is stone.

8. The solid surface of claim 1 wherein said image is printed using a high resolution process in the range of 872cm$^2$ to 3488 cm$^2$.

9. The solid surface of claim 8 wherein said high resolution process is a gravure process.

10. The solid surface of claim 8 wherein said high resolution process comprises printing from a digitized image.

11. The solid surface of claim 1 wherein each of said outer layer and said backing layer is 0.76 mm to 6.4 mm thick.

12. The solid surface of claim 11 wherein said polymeric film, component (B), is 0.025 mm to 0.254 mm thick.

13. The solid surface of claim 1 wherein said polymeric film, component (C), is selected from the group consisting of polyvinyl chloride and PETG copolyester.

14. The solid surface of claim 1 wherein said solid surface is thermoformable.

15. The solid surface of claim 1 wherein said image is printed with a solvent-based laminating ink.

16. The solid surface of claim 1 further comprising a layer of colorless laminating ink between said top side of said polymeric film and said transparent outer layer.

17. The solid surface of claim 1 wherein said outer layer comprises a top surface, said solid surface further comprising a transparent bilayer coat laminated to said top surface, said bilayer coat comprising a hard, scratch-resistant coat.

18. The solid surface of claim 17 wherein said hard, scratch-resistant coat is selected from the group consisting of UV-cured cross-linked acrylic, electron-beam-cured cross-linked acrylic, vacuum-cured urethane, UV-cured or electron-beam-cured silicon with acrylic or heat cured urethane or plastisol, and combinations thereof.

19. The solid surface of claim 17 further comprising a layer of colorless solvent-based laminating ink between said transparent outer layer and said bilayer coat.

\* \* \* \* \*